United States Patent
Frenkel et al.

(10) Patent No.: US 9,268,957 B2
(45) Date of Patent: Feb. 23, 2016

(54) ENCRYPTION- AND DECRYPTION-ENABLED INTERFACES

(75) Inventors: Lior Frenkel, Moshav Misgav Dov (IL); Amir Zilberstein, Yad Rambam (IL)

(73) Assignee: Waterfall Security Solutions Ltd., Rosh Ha'Ayin (IL)

( * ) Notice: Subject to any disclaimer, the term of this patent is extended or adjusted under 35 U.S.C. 154(b) by 501 days.

(21) Appl. No.: 12/518,276

(22) PCT Filed: Dec. 11, 2007

(86) PCT No.: PCT/IL2007/001535
§ 371 (c)(1),
(2), (4) Date: Jun. 9, 2009

(87) PCT Pub. No.: WO2008/072234
PCT Pub. Date: Jun. 19, 2008

(65) Prior Publication Data
US 2010/0278339 A1    Nov. 4, 2010

(30) Foreign Application Priority Data
Dec. 12, 2006    (IL) .......................................... 180020

(51) Int. Cl.
| G06F 11/30 | (2006.01) |
| G06F 21/62 | (2013.01) |
| G06F 21/83 | (2013.01) |
| G06F 21/84 | (2013.01) |

(52) U.S. Cl.
CPC ............... *G06F 21/62* (2013.01); *G06F 21/83* (2013.01); *G06F 21/84* (2013.01)

(58) Field of Classification Search
CPC ....................................................... G06F 21/62
USPC .......... 380/210, 216, 231; 713/169, 171, 182, 713/189, 193
See application file for complete search history.

(56) References Cited

U.S. PATENT DOCUMENTS

| 4,163,289 A | 7/1979 | Schmidt |
| 4,213,177 A | 7/1980 | Schmidt |
| 4,214,302 A | 7/1980 | Schmidt |
| 4,375,665 A | 3/1983 | Schmidt |
| 4,964,046 A | 10/1990 | Mehrgardt et al. |

(Continued)

FOREIGN PATENT DOCUMENTS

| EP | 1632833 A2 | 3/2006 |
| GB | 2267986 A | 12/1993 |

(Continued)

OTHER PUBLICATIONS

International Application PCT/IB2009/054541 Search Report dated Feb. 25, 2010.

(Continued)

*Primary Examiner* — Farid Homayounmehr
*Assistant Examiner* — Susman Debnath
(74) *Attorney, Agent, or Firm* — D. Kligler IP Services LTD.

(57) ABSTRACT

Decryption apparatus includes an input memory (48), which is coupled to receive encrypted data, and an output transducer (28), for presenting decrypted data to a user. A decryption processor (50) is coupled to read and decrypt the encrypted data from the input memory but is incapable of writing to the input memory, and is coupled to convey the decrypted data to the output transducer for presentation to the user.

19 Claims, 3 Drawing Sheets

(56) References Cited

U.S. PATENT DOCUMENTS

| | | | |
|---|---|---|---|
| 4,985,919 A | 1/1991 | Naruse et al. | |
| 4,987,595 A | 1/1991 | Marino, Jr. et al. | |
| 5,163,138 A | 11/1992 | Thirumalai | |
| 5,185,877 A | 2/1993 | Bissett et al. | |
| 5,289,478 A | 2/1994 | Barlow et al. | |
| 5,388,212 A | 2/1995 | Grube et al. | |
| 5,530,758 A | 6/1996 | Marino, Jr. et al. | |
| 5,548,646 A | 8/1996 | Aziz et al. | |
| 5,677,952 A | 10/1997 | Blakley et al. | |
| 5,732,278 A | 3/1998 | Furber et al. | |
| 5,748,871 A | 5/1998 | DuLac et al. | |
| 5,815,577 A | 9/1998 | Clark | |
| 5,822,435 A * | 10/1998 | Boebert et al. | 713/192 |
| 5,825,879 A | 10/1998 | Davis | |
| 5,829,046 A | 10/1998 | Tzelnic et al. | |
| 5,835,726 A | 11/1998 | Shwed et al. | |
| 5,940,507 A | 8/1999 | Cane et al. | |
| 5,946,399 A | 8/1999 | Kitaj et al. | |
| 5,995,628 A | 11/1999 | Kitaj et al. | |
| 6,023,570 A | 2/2000 | Tang et al. | |
| 6,049,611 A | 4/2000 | Tatebayashi et al. | |
| 6,134,661 A | 10/2000 | Topp | |
| 6,167,459 A | 12/2000 | Beardsley et al. | |
| 6,170,023 B1 | 1/2001 | Beardsley et al. | |
| 6,185,638 B1 | 2/2001 | Beardsley et al. | |
| 6,202,095 B1 | 3/2001 | Beardsley et al. | |
| 6,239,810 B1 | 5/2001 | Van Hook et al. | |
| 6,240,514 B1 | 5/2001 | Inoue et al. | |
| 6,289,377 B1 | 9/2001 | Lalwaney et al. | |
| 6,311,272 B1 | 10/2001 | Gressel | |
| 6,317,831 B1 | 11/2001 | King | |
| 6,442,607 B1 | 8/2002 | Korn et al. | |
| 6,467,009 B1 | 10/2002 | Winegarden et al. | |
| 6,470,449 B1 | 10/2002 | Blandford | |
| 6,574,640 B1 | 6/2003 | Stahl | |
| 6,601,126 B1 | 7/2003 | Zaidi et al. | |
| 6,601,170 B1 | 7/2003 | Wallace, Jr. | |
| 6,615,244 B1 | 9/2003 | Singhal | |
| 6,643,701 B1 | 11/2003 | Aziz et al. | |
| 6,738,388 B1 | 5/2004 | Stevenson et al. | |
| 6,738,742 B2 | 5/2004 | Badt et al. | |
| 6,758,404 B2 | 7/2004 | Ladyansky | |
| 6,862,663 B1 | 3/2005 | Bateman | |
| 6,915,369 B1 | 7/2005 | Dao et al. | |
| 6,915,435 B1 | 7/2005 | Merriam | |
| 6,931,549 B1 | 8/2005 | Ananda | |
| 6,957,330 B1 | 10/2005 | Hughes | |
| 6,963,817 B2 | 11/2005 | Ito et al. | |
| 6,966,001 B2 | 11/2005 | Obara et al. | |
| 6,970,183 B1 | 11/2005 | Monroe | |
| 6,986,061 B1 | 1/2006 | Kunzinger | |
| 7,031,322 B1 | 4/2006 | Matsuo | |
| 7,062,587 B2 | 6/2006 | Zaidi et al. | |
| 7,069,437 B2 | 6/2006 | Williams | |
| 7,100,048 B1 | 8/2006 | Czajkowski et al. | |
| 7,171,566 B2 | 1/2007 | Durrant | |
| 7,200,693 B2 | 4/2007 | Jeddeloh | |
| 7,234,158 B1 | 6/2007 | Guo et al. | |
| 7,254,663 B2 | 8/2007 | Bartley et al. | |
| 7,260,833 B1 | 8/2007 | Schaeffer | |
| 7,324,515 B1 | 1/2008 | Chapman | |
| 7,366,894 B1 | 4/2008 | Kalimuthu et al. | |
| 7,523,856 B2 | 4/2009 | Block et al. | |
| 7,581,097 B2 | 8/2009 | Catherman et al. | |
| 7,649,452 B2 | 1/2010 | Zilberstein et al. | |
| 7,660,959 B2 | 2/2010 | Asher et al. | |
| 7,675,867 B1 | 3/2010 | Mraz et al. | |
| 7,685,436 B2 | 3/2010 | Davis et al. | |
| 7,698,470 B2 | 4/2010 | Ruckerbauer et al. | |
| 7,716,467 B1 | 5/2010 | Deffet et al. | |
| 7,761,529 B2 | 7/2010 | Choubal et al. | |
| 7,761,704 B2 | 7/2010 | Ho et al. | |
| 7,792,300 B1 | 9/2010 | Caronni | |
| 7,814,316 B1 | 10/2010 | Hughes et al. | |
| 7,815,548 B2 | 10/2010 | Barre et al. | |
| 7,845,011 B2 | 11/2010 | Hirai | |
| 7,849,330 B2 | 12/2010 | Osaki | |
| 7,941,828 B2 | 5/2011 | Jauer | |
| 7,992,209 B1 | 8/2011 | Menoher et al. | |
| 8,041,832 B2 | 10/2011 | Hughes et al. | |
| 8,046,443 B2 | 10/2011 | Parker et al. | |
| 8,223,205 B2 | 7/2012 | Frenkel et al. | |
| 2001/0033332 A1 | 10/2001 | Kato et al. | |
| 2002/0064282 A1 | 5/2002 | Loukianov et al. | |
| 2002/0065775 A1 | 5/2002 | Monaghan | |
| 2002/0077990 A1 * | 6/2002 | Ryan, Jr. | 705/60 |
| 2002/0083120 A1 | 6/2002 | Soltis | |
| 2002/0112181 A1 | 8/2002 | Smith | |
| 2002/0174010 A1 | 11/2002 | Rice | |
| 2002/0188862 A1 | 12/2002 | Trethewey et al. | |
| 2002/0191866 A1 | 12/2002 | Tanabe | |
| 2002/0199181 A1 | 12/2002 | Allen | |
| 2003/0005295 A1 | 1/2003 | Girard | |
| 2003/0037247 A1 | 2/2003 | Obara et al. | |
| 2003/0061505 A1 | 3/2003 | Sperry et al. | |
| 2003/0114204 A1 | 6/2003 | Allen et al. | |
| 2003/0140090 A1 | 7/2003 | Rezvani et al. | |
| 2003/0140239 A1 | 7/2003 | Kuroiwa et al. | |
| 2003/0159029 A1 | 8/2003 | Brown et al. | |
| 2003/0188102 A1 | 10/2003 | Nagasoe et al. | |
| 2003/0217262 A1 | 11/2003 | Kawai et al. | |
| 2004/0022107 A1 | 2/2004 | Zaidi et al. | |
| 2004/0024710 A1 | 2/2004 | Fernando et al. | |
| 2004/0070620 A1 | 4/2004 | Fujisawa | |
| 2004/0071311 A1 | 4/2004 | Choi et al. | |
| 2004/0080615 A1 | 4/2004 | Klein et al. | |
| 2004/0125077 A1 * | 7/2004 | Ashton | 345/156 |
| 2004/0175123 A1 | 9/2004 | Lim et al. | |
| 2004/0181679 A1 | 9/2004 | Dettinger et al. | |
| 2004/0198494 A1 * | 10/2004 | Nguyen et al. | 463/42 |
| 2004/0217890 A1 | 11/2004 | Woodward et al. | |
| 2004/0247308 A1 | 12/2004 | Kawade | |
| 2004/0250096 A1 | 12/2004 | Cheung et al. | |
| 2005/0015624 A1 | 1/2005 | Ginter et al. | |
| 2005/0033990 A1 | 2/2005 | Harvey et al. | |
| 2005/0057774 A1 * | 3/2005 | Maruyama | 358/1.15 |
| 2005/0066186 A1 | 3/2005 | Gentle et al. | |
| 2005/0071632 A1 | 3/2005 | Pauker et al. | |
| 2005/0085964 A1 | 4/2005 | Knapp et al. | |
| 2005/0091487 A1 | 4/2005 | Cross et al. | |
| 2005/0108524 A1 | 5/2005 | Witchey | |
| 2005/0119967 A1 | 6/2005 | Ishiguro et al. | |
| 2005/0120214 A1 | 6/2005 | Yeates et al. | |
| 2005/0120251 A1 | 6/2005 | Fukumori | |
| 2005/0138369 A1 | 6/2005 | Lebovitz et al. | |
| 2005/0165939 A1 | 7/2005 | Nikunen et al. | |
| 2005/0216648 A1 | 9/2005 | Jeddeloh | |
| 2005/0264415 A1 | 12/2005 | Katz | |
| 2006/0047887 A1 | 3/2006 | Jeddeloh | |
| 2006/0064550 A1 | 3/2006 | Katsuragi et al. | |
| 2006/0085354 A1 | 4/2006 | Hirai | |
| 2006/0085534 A1 | 4/2006 | Ralston et al. | |
| 2006/0095629 A1 | 5/2006 | Gower et al. | |
| 2006/0136724 A1 | 6/2006 | Takeshima et al. | |
| 2006/0155939 A1 * | 7/2006 | Nagasoe et al. | 711/152 |
| 2006/0161791 A1 * | 7/2006 | Bennett | 713/193 |
| 2006/0165347 A1 | 7/2006 | Mita | |
| 2006/0173787 A1 | 8/2006 | Weber et al. | |
| 2006/0179208 A1 | 8/2006 | Jeddeloh | |
| 2006/0220903 A1 | 10/2006 | Zigdon et al. | |
| 2006/0224848 A1 | 10/2006 | Matulik et al. | |
| 2006/0242423 A1 | 10/2006 | Kussmaul | |
| 2006/0248582 A1 | 11/2006 | Panjwani et al. | |
| 2006/0259431 A1 | 11/2006 | Poisner | |
| 2006/0271617 A1 | 11/2006 | Hughes et al. | |
| 2006/0288010 A1 | 12/2006 | Chen et al. | |
| 2006/0294295 A1 | 12/2006 | Fukuzo | |
| 2007/0028027 A1 | 2/2007 | Janzen et al. | |
| 2007/0028134 A1 | 2/2007 | Gammel et al. | |
| 2007/0043769 A1 | 2/2007 | Kasahara et al. | |
| 2007/0055814 A1 | 3/2007 | Jeddeloh | |
| 2007/0063866 A1 | 3/2007 | Webb | |
| 2007/0094430 A1 * | 4/2007 | Speier et al. | 710/200 |
| 2007/0112863 A1 | 5/2007 | Niwata et al. | |

(56) References Cited

U.S. PATENT DOCUMENTS

| | | | |
|---|---|---|---|
| 2007/0150752 | A1 | 6/2007 | Kudelski |
| 2007/0180263 | A1 | 8/2007 | Delgrosso et al. |
| 2007/0180493 | A1 | 8/2007 | Croft et al. |
| 2007/0203970 | A1 | 8/2007 | Nguyen |
| 2007/0204140 | A1 | 8/2007 | Shade |
| 2007/0258595 | A1 | 11/2007 | Choy |
| 2007/0283297 | A1 | 12/2007 | Hein et al. |
| 2008/0005325 | A1 | 1/2008 | Wynn et al. |
| 2008/0059379 | A1 | 3/2008 | Ramaci et al. |
| 2008/0065837 | A1* | 3/2008 | Toyonaga et al. ............. 711/148 |
| 2008/0066192 | A1 | 3/2008 | Greco et al. |
| 2008/0082835 | A1 | 4/2008 | Asher et al. |
| 2008/0120511 | A1 | 5/2008 | Naguib |
| 2008/0144821 | A1* | 6/2008 | Armstrong ................... 380/216 |
| 2008/0155273 | A1 | 6/2008 | Conti |
| 2008/0209216 | A1 | 8/2008 | Kelly et al. |
| 2008/0244743 | A1 | 10/2008 | Largman et al. |
| 2008/0263672 | A1 | 10/2008 | Chen et al. |
| 2008/0288790 | A1 | 11/2008 | Wilson |
| 2009/0019325 | A1 | 1/2009 | Miyamoto et al. |
| 2009/0319773 | A1 | 12/2009 | Frenkel et al. |
| 2009/0328183 | A1 | 12/2009 | Frenkel et al. |
| 2010/0275039 | A1 | 10/2010 | Frenkel et al. |
| 2010/0324380 | A1 | 12/2010 | Perkins et al. |
| 2011/0107023 | A1 | 5/2011 | McCallister et al. |
| 2011/0213990 | A1 | 9/2011 | Poisner |
| 2013/0179685 | A1 | 7/2013 | Weinstien et al. |
| 2014/0040679 | A1 | 2/2014 | Shimizu et al. |
| 2014/0122965 | A1 | 5/2014 | Zeng et al. |

FOREIGN PATENT DOCUMENTS

| | | |
|---|---|---|
| GB | 2371125 A | 7/2002 |
| WO | 9526085 A1 | 9/1995 |
| WO | 0110079 A1 | 2/2001 |
| WO | 01/63879 A1 | 8/2001 |
| WO | 2008072234 A2 | 6/2008 |
| WO | 2010049839 A2 | 5/2010 |

OTHER PUBLICATIONS

International Application PCT/IB2009/055396 "Secure handling of identification tokens" filed on Nov. 29, 2009.
Dierks, T., "The TLS Protocol", version 1.0, RFC 2246, Networking Group of IETF, Jan. 1999.
European Application EP09162276 Search Report dated Aug. 9, 2010.
International Application PCT/IB09/55396 Search Report dated Jul. 13, 2010.
Israeli Application # 180020 "Encryption- and decryption-enabled interfaces" Official Action dated Sep. 13, 2010.
International Application PCT/IL2007/001535 Search Report dated Jun. 17, 2008.
International Application PCT/IL2008/001187 Search Report dated Jan. 23, 2009.
European Patent Application # 07849562.9 Extended search report dated Jun. 8, 2011.
European Patent Application # 09162276.1 Examination Report dated Apr. 15, 2011.
Israel Patent Application # 186473 Official Action dated Jun. 12, 2011.
Israel Patent Application # 185795 Official Action dated May 5, 2011.
U.S. Appl. No. 12/676,143 Official Action dated Jul. 13, 2012.
EP Patent Application # 08702651.4 Search report dated May 11, 2012.
Frenkel, L., "Unidirectional Information Transfer", Web issue, Jun. 2005.
U.S. Appl. No. 12/447,470 Official Action dated Sep. 14, 2011.
U.S. Appl. No. 12/447,470 Official Action dated Feb. 9, 2012.
U.S. Appl. No. 12/438,548 Official Action dated Mar. 6, 2012.
U.S. Appl. No. 12/306,692 Official Action dated Feb. 13, 2012.
European Patent Application # 07805530.8 Search report dated Mar. 6, 2012.
IL Patent Application # 177,756 Official Action dated Aug. 17, 2010.
IL Patent Application # 180,748 Official Action dated Oct. 25, 2010.
IL Patent Application # 201473 Official Action dated May 8, 2011.
U.S. Appl. No. 12/447,470 Official Action dated Mar. 25, 2011.
U.S. Appl. No. 11/823,950 Official Action dated Jun. 22, 2009.
U.S. Appl. No. 12/306,692 Official Action dated Sep. 28, 2011.
International Application PCT/IL2008/000886 Search Report dated Nov. 13, 2008.
International Application PCT/IL2008/000070 Search Report dated Jun. 16, 2008.
International Application PCT/IL2007/001070 Search Report dated Jul. 25, 2008.
International Application PCT/IL2006/001499 Search Report dated Apr. 8, 2008.
International Application PCT/IIL2008/001513 Search Report dated Mar. 10, 2009.
Innominate Security Technologies, "Press Release: Innominate joins Industrial Defender Enabled Partner Program", Germany, Apr. 14, 2008 (http://www.innominate.com/content/view/288/120/lang,en/).
Waterfall Security Solutions Ltd., "Waterfall One Way Link Technology", 2008 ( http://www.waterfall-solutions.com/home/Waterfall.sub.--Technology.a- spx).
MSISAC, "Cyber Security Procurement Language for Control Systems", version 1.8, revision 3, Feb. 2008 (http://www.msisac.org/scada/documents/4march08scadaprocure.pdf).
Axis Communications, "Axis Network Cameras", 2008 (http://www.axis.com/products/video/camera/index.htm).
Check Point Software Technologies Ltd., "Extended Unified Threat Management capabilities with new multi-layer messaging security deliver best all-inclusive security solution", USA, Nov. 18, 2008 (http://www.checkpoint.com/press/2008/utm-1-edge-upgrade-111808.html).
Einey, D., "Waterfall IP Surveillance Enabler", Jul. 2007.
U.S. Appl. No. 11/977,391 Official Action dated Jun. 14, 2011.
U.S. Appl. No. 12/447,470 Official Action dated Aug. 30, 2012.
U.S. Appl. No. 12/480,692 Official Action dated May 10, 2012.
U.S. Appl. No. 12/480,692 Official Action dated Nov. 9, 2012.
U.S. Appl. No. 12/676,143 Official Action dated Oct. 25, 2012.
U.S. Appl. No. 14/248,419 Office Action dated Jul. 25, 2014.
IBM Technical Disclosure Bulletin, Separate Write/Read Logical Paths to Optimize Library Network File System Data Rates, vol. 37, No. 09, pp. 1-3, Sep. 1994.
U.S. Appl. No. 13/487,265 Office Action dated Nov. 22, 2013.
U.S. Appl. No. 14/512,496 Office Action dated Jan. 23, 2015.
U.S. Appl. No. 14/512,496 Office Action dated Nov. 5, 2015.
U.S. Appl. No. 14/813,144 Office Action dated Oct. 15, 2015.

* cited by examiner

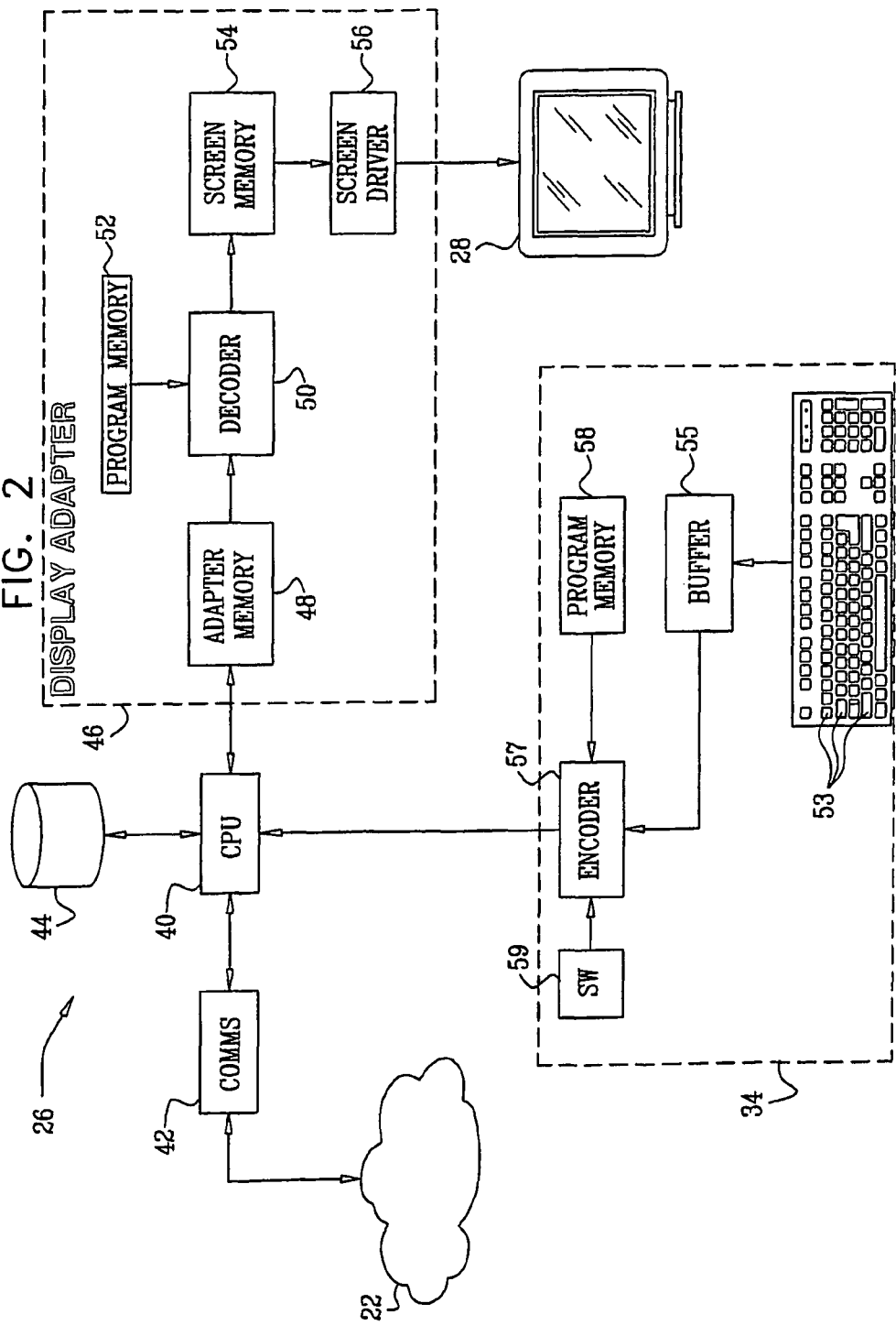

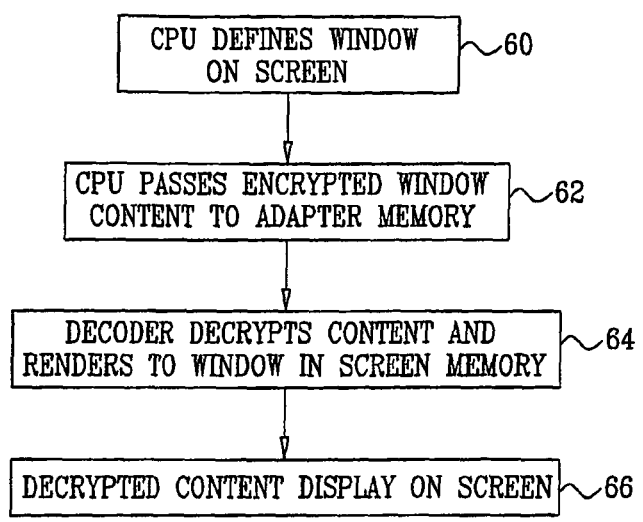

ENCRYPTION-AND DECRYPTION-ENABLED INTERFACES

FIELD OF THE INVENTION

The present invention relates generally to data decryption, and specifically to methods and devices for preventing unauthorized parties from accessing decrypted data.

BACKGROUND OF THE INVENTION

Data encryption is widely used in preventing unauthorized access to data. Various methods of data encryption are known in the art. In general, these methods use a key to convert data to a form that is unintelligible to a reader (human or machine), and require an appropriate key in order to decrypt the data. Symmetric encryption methods use the same key for both encryption and decryption. Such symmetric methods include the well-known DES (Data Encryption Standard) and AES (Advanced Encryption Standard) algorithms. In asymmetric encryption methods, such as the RSA (Rivest Shamir Adelman) algorithm, a computer that is to receive encrypted data generates complementary public and private keys and transmits the public key to the sender. After the sender has encrypted the data using the public key, only the holder of the private key can decrypt it.

SUMMARY OF THE INVENTION

Modern methods of encryption make it very difficult for a malicious party who intercepts an encrypted message to decrypt the message contents. On the other hand, once a computer that receives the message has decrypted it using the proper key and method, the message contents are typically held in clear (unencrypted) form on the receiving computer, at least temporarily. If a malicious party can gain access to the memory (RAM or disk) of the receiving computer (using a "Trojan horse" or other "spyware" program, for example), the malicious party will be able to read the message contents. Thus, the receiving computer itself becomes the weak link in the security chain over which encrypted messages are carried. A similar problem may occur with data that are input to the computer in clear form from an input device, before the computer has encrypted the data.

Embodiments of the present invention provide methods and apparatus for encryption and decryption that can be used to prevent unauthorized parties from accessing decrypted data on the receiving computer. In some embodiments, a decryption processor reads and decrypts encrypted data from an input memory that receives the encrypted data, but the decryption processor is incapable of writing to the input memory. Rather, the decryption processor is coupled to convey the decrypted data solely to an output transducer, such as a video display, printer, or audio speaker, for presentation to the user. Therefore, the decrypted data are never held on the receiving computer in a memory that could be accessed by unauthorized parties, and there is no link available over which the decryption processor could be made to transmit the decrypted data out of the computer other than directly to the output transducer.

In other embodiments, an encryption processor is coupled between an input transducer, such as a keyboard, microphone, touch screen or imaging device, and the computer. The encryption processor receives and encrypts input data signals from the input transducer, so that the data input to the computer are already encrypted. Typically, the computer is able to access the input transducer only via the encryption processor, so that an unauthorized party cannot gain access to the clear signals that are produced by the input transducer itself. The computer may then transmit and/or store the input data from the input transducer in encrypted form, without ever having to decrypt the data.

There is therefore provided, in accordance with an embodiment of the present invention, decryption apparatus, including:

an input memory, which is coupled to receive encrypted data;

an output transducer, for presenting decrypted data to a user; and a decryption processor, which is coupled to read and decrypt the encrypted data from the input memory but is incapable of writing to the input memory, and which is coupled to convey the decrypted data to the output transducer for presentation to the user.

In one embodiment, the apparatus includes an output memory, which is coupled to receive the decrypted data from the decryption processor and to output the decrypted data to the output transducer, wherein the input memory is coupled to receive the encrypted data from a central Processing unit (CPU) of a computer, and wherein the output memory is inaccessible to the CPU.

In some embodiments, the decryption processor has an output that is coupled to the output transducer, and the apparatus includes a central processing unit. (CPU) and a communication interface, wherein the CPU is coupled to receive the encrypted data from the communication interface and to write the encrypted data to the input memory, and wherein the CPU is unable to access the output of the decryption processor. In one embodiment, the output transducer includes a video display, and the CPU is arranged to define a window on the video display for presentation of the decrypted data, and wherein the decryption processor is arranged to write the decrypted data to the window. Additionally or alternatively, the decryption processor is arranged to decrypt the encrypted data using a predetermined key, and the CPU is unable to access the predetermined key.

The output transducer may include a video display, an audio speaker, or a printer.

There is also provided, in accordance with an embodiment of the present invention, a method for decryption, including:

receiving encrypted data in an input memory;

reading and decrypting the encrypted data from the input memory using a decryption processor, which is incapable of writing to the input memory; and conveying the decrypted data from the decryption processor to an output transducer for presentation to a user.

There is additionally provided, in accordance with an embodiment of the present invention, a computer input device for operation with a computer, including:

an input transducer, which is coupled to receive an input from a user and to generate a data signal responsively to the input;

an encryption processor, which is coupled to process the data signal so as to output data to the computer, and which has a first operational mode in which the encryption processor encrypts the data signal using an encryption key not accessible to the computer so that the data are unintelligible to the computer, and a second operational mode in which the data are intelligible to the computer; and a mode switch, which is operable by a user so as to switch between the first and second operational modes of the encryption processor.

There is further provided, in accordance with an embodiment of the present invention, a method for inputting data to a computer, including:

receiving a data signal from an input transducer responsively to an input by a user;

processing the data signal so as to generate data for output to the computer using an encryption processor, which has a first operational mode in which the encryption processor encrypts the data signal using an encryption key not accessible to the computer so that the data are unintelligible to the computer, and a second operational mode in which the data are intelligible to the computer;

setting a mode switch so as to select one of the first and second operational modes; and outputting the data to the computer in accordance with the selected one of the operational modes.

The present invention will be more fully understood from the following detailed description of the embodiments thereof, taken together with the drawings in which:

BRIEF DESCRIPTION OF THE DRAWINGS

FIG. 2 is a block diagram that schematically shows elements of a terminal for encrypting and decrypting data, in accordance with an embodiment of the present invention; and FIG. 3 is a flow chart that schematically illustrates a method for decrypting and displaying encrypted data, in accordance with an embodiment of the present invention.

DETAILED DESCRIPTION OF EMBODIMENTS

Figure 1:
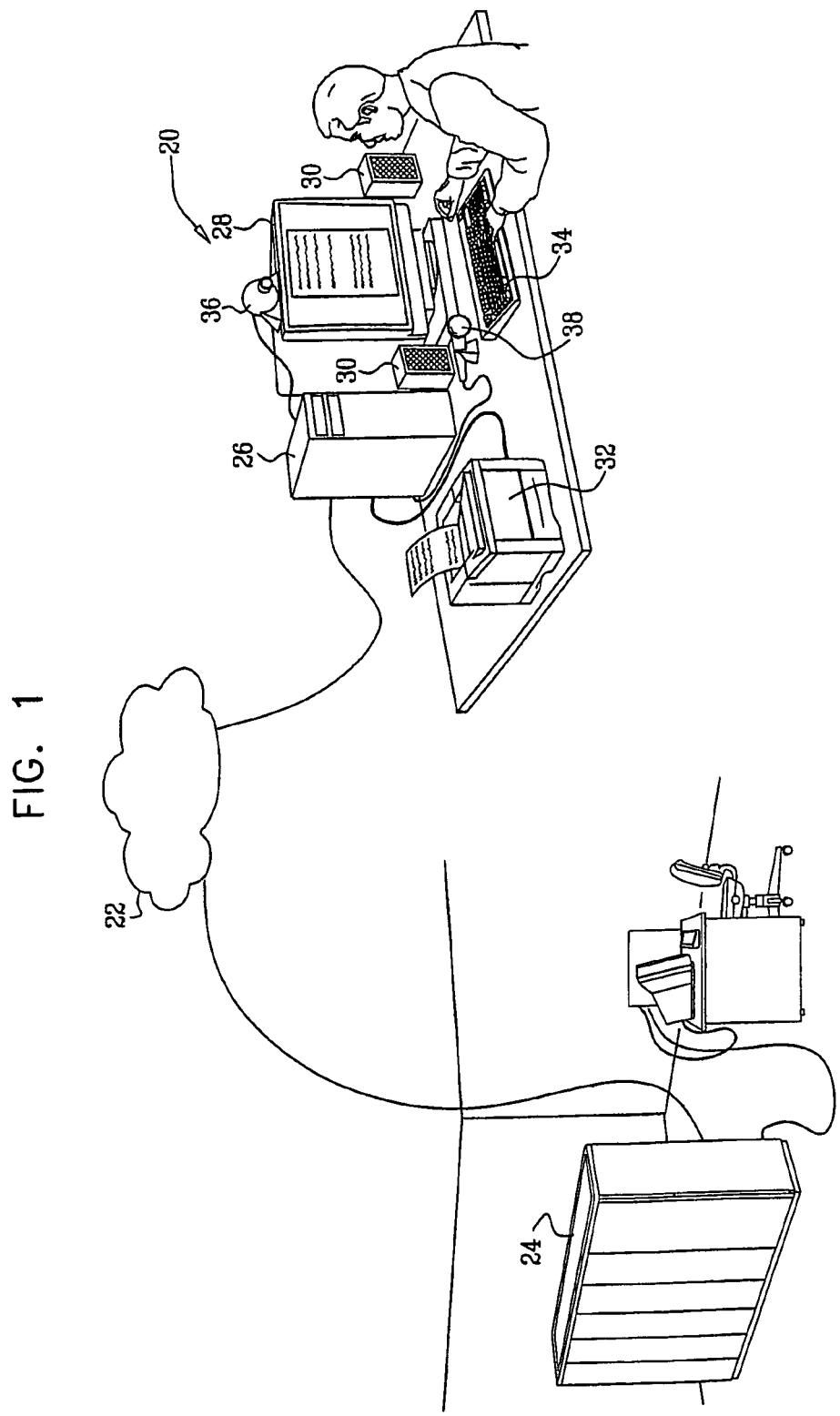
FIG. 1 is a schematic, pictorial illustration of a system for transmission, reception and processing of encrypted data, in accordance with an embodiment of the present invention.

FIG. 1 is a schematic, pictorial illustration of a system for transmission, reception and decryption of encrypted data, in accordance with an embodiment of the present invention. A source computer 24 transmits encrypted data over a network 22 to a receiving terminal 20. The data may be encrypted in accordance with any suitable method of encryption that is known in the art, including both symmetric and asymmetric methods. Network 22 may comprise the Internet or substantially any other public or private computer network.

Terminal 20 comprises a computer console 26, which is coupled to one or more output transducers for converting data in the console to a form in which a human user can receive and understand the data content. Examples of output transducers that are shown in FIG. 1 include a video display screen 28, audio speakers 30 and a printer 32. In the description that follows, display screen 28 is used as the target transducer for purposes of secure decryption of encrypted data received by terminal 20. Alternatively, the audio speakers or printer may be used for this purpose, as may output transducers of other types (not shown in the figures).

Typically, terminal 20 also comprises one or more user input devices, which may comprise text, image capture and/or audio input transducers. Typically, the text input transducer comprises a keyboard 34. Alternatively or additionally, the user input devices may comprise a camera 36, or a microphone 38, or a touch-sensitive screen, scanner or other types of input devices known in the art (not shown in the figures). In the description that follows, certain techniques for secure input of encrypted data to console 26 are described, by way of example, with reference to keyboard 34. These techniques may similarly be applied, mutatis mutandis, to input devices of other types.

FIG. 2 is a block diagram that schematically shows details of console 26, in accordance with an embodiment of the present invention. Console 26 may be a general-purpose computer with a specialized display adapter 46, which performs secure data decryption functions. Alternatively, the decryption functions of adapter 46 may be performed by a decryption circuit that is integrated into the electronics of screen 28 (or similarly integrated into the electronics of another type of output transducer), rather than into the computer console. Additionally or alternatively, keyboard 34 is adapted, as described hereinbelow, to perform secure data encryption. Further alternatively, terminal 20 may comprise one or more dedicated, special-purpose devices that implement the principles of secure decryption and/or encryption that are described herein. Although for the sake of completeness, both secure decryption and secure encryption functions are illustrated in FIG. 2, terminal may alternatively be configured with only secure decryption or only secure encryption capabilities.

Console 26 comprises a central processing unit (CPU) 40, which performs general computing functions. CPU 40 is coupled via a communication interface 42 to transmit and receive data to and from network 22. The console comprises a memory 44 (which may typically comprise both RAM and disk memory), which is accessed by the CPU in a conventional manner. Typically, upon receiving an encrypted data transmission, CPU 40 writes the encrypted data to memory 44. In conventional scenarios, the key required to decrypt the data may also be held in the memory. The CPU would then decrypt the data using this key, and then would output the decrypted data to the user automatically or upon request. In the course of such a process, the CPU typically writes the decrypted data to memory 44. As a result, if a malicious party is able to gain access to the memory through a software security breach, for example, that party may be able to read the decrypted data (generally by causing CPU 40 or another component of terminal 20 to transmit the decrypted data over network 22), notwithstanding the strength of the encryption that was used in transmission of the data over the network.

To avoid this sort of scenario in the present embodiment, CPU 40 does not decrypt the encrypted data transmitted by source computer 24. Rather, the CPU writes the encrypted data to an adapter memory 48 of display adapter 46. Memory 48 serves as the input memory for decryption purposes. A decryption processor 50 in the display adapter then decodes the encrypted data using the appropriate key and program instructions stored in a program memory 52. The decryption processor may comprise a programmable processing device, such as a microprocessor or field-programmable gate array (FPGA), or it may alternatively comprise a hard-coded logic device. (In the latter case, memory 52 may be unnecessary, or this memory may be used only to hold the decryption key and/or other basic operating data.)

Processor 50 writes the decrypted data to a screen memory 54, typically in the form of either a bitmap or of characters and/or vectors for rendering to screen 28. The screen memory thus serves as the output memory for the decryption process. A screen driver circuit 56 drives screen 28 to display the contents of memory 54. Alternatively, decryption processor 50 may feed the screen driver circuit directly, or the functions of the decryption processor and the screen driver may be integrated in a single integrated circuit.

As illustrated by the directions of the arrows in adapter 46, decryption processor 50 is coupled to adapter memory 48 in a read-only configuration, i.e., the processor is able to read from the adapter, but not to write back to the adapter. This configuration may be implemented physically in hardware, by connecting the write output of processor 50 to screen memory 54, but not to adapter memory 48. Similarly, the screen memory may be configured so that processor 50 can overwrite the memory contents, but the contents of the memory may be read out only by screen driver circuit 56. As a result, even if an unauthorized party is successful in gaining access, via a software breach, to CPU 40 and to memories and 48, it will be physically impossible for this party to access the decrypted data generated by processor 50. Alternatively, decryption processor 50 may be configured in software to disable write access to memory 48 (and to other elements outside adapter 46), but if so, it is desirable that the software be stored in a way that prevents unauthorized parties from accessing and changing it.

Adapter 46 may be configured as a plug-in card, which takes the place of a conventional display adapter in console 26. In this case, terminal 20 may be a standard personal computer, which is enhanced for secure data decryption by installation of adapter 46. Alternatively, some or all of the functions of adapter 46 may be integrated into the motherboard of console 26. Further alternatively, as noted above, the secure decryption functions of adapter 46 may be integrated into the electronics of display screen 28, in the form of suitable hardware components and/or embedded software. In this latter embodiment, console 26 outputs encrypted data to screen 28, and the circuitry in the screen decrypts and displays the data. Although the elements of adapter 46 are shown in FIG. 2, for the sake of clarity, as separate functional blocks, in practice some or all of these functional blocks may be combined into in or more integrated circuit chips.

As noted earlier, although the secure decryption functions of this embodiment are implemented in conjunction with display screen 28, such functions may similarly be integrated with other types of output transducers. For example, a sound card with decryption capabilities may be coupled to drive speakers 30 to play decrypted messages, or a printer interface with decryption capabilities may drive printer 32 to print decrypted text and/or graphics. As in the case of screen 28, the secure decryption capabilities in these example may be incorporated in console 26 or in the speakers or printer.

The secure encryption functions of terminal 20 are embodied in keyboard 34. The keyboard comprises a set of keys 53, which generate respective data signals when depressed by the user, as is known in the art. These data signals are digitized and, optionally, held in a buffer 55. The digitized data signals are then encoded by an encryption processor 57, using an appropriate key and program instructions stored in a program memory 58. The encryption processor may comprise a programmable processing device, such as a microprocessor or field-programmable gate array (FPGA), or it may alternatively comprise a hard-coded logic device, as in the case of decryption processor 50. In the embodiment shown in FIG. 2, encryption processor 57 is integrated with keyboard 34, typically within the keyboard package. Alternatively, the encryption processor may be packaged separately from the keyboard. Further alternatively or additionally, the functions of decryption processor 50 and encryption processor 57 may be integrated together in a single, secure input/output unit.

Typically, encryption processor 57 has two modes of operation:
1. An encryption mode, in which the processor encrypts the data signal using an encryption key that is not accessible to CPU 40; and
2. A clear mode, in which the encryption function of processor 57 is turned off or bypassed, so that the output data from the keyboard are intelligible to the CPU, typically in the standard keyboard data output format.

A user-operable switch 59 permits the user to toggle between the two modes. The switch may simply be a manual switch on the keyboard package, so that even if a hacker gains access to console 26 via communication interface 42, for example, the hacker will be unable to change the switch setting.

In normal operation, the user maintains switch 59 in the clear position, so that the user can interact with terminal via keyboard 34 in the conventional manner. From time to time, however, the user may toggle switch 59 to the encryption mode, whereupon encryption processor 57 will output encrypted data to CPU 40. The CPU in this case is unable to decipher the encrypted data (and cannot access the unencrypted data signals in the keyboard), but rather stores the encrypted data in memory 44 or transmits the encrypted data via communication interface 42 in accordance with instructions that the CPU received previously.

For example, in a secure communication session between computer 24 and terminal 20, computer 24 may prompt the user to flip switch 59 to the encryption mode position before inputting some particularly sensitive item of information. Software running on the terminal may prompt CPU 40 to generate a data packet for transmission to computer 24, and to insert the encrypted data that are entered via keyboard 34 into the payload of the packet before transmission. Computer 24 holds the necessary key to decrypt the payload upon reception, but CPU 40 does not have access to the key. Therefore, even if a hacker were to gain control over the CPU and copy the data transmitted to computer 24, the hacker will still have no way of deciphering the encrypted payload data.

FIG. 3 is a flow chart that schematically illustrates a method for decrypting and displaying encrypted data, in accordance with an embodiment of the present invention. The method is described, for the sake of clarity, with reference to the hardware configuration shown in FIG. 2, but it may similarly be carried out, mutatis mutandis, in other configurations, such as those mentioned above. In the embodiment of FIG. 3, it is assumed that terminal 20 functions is a personal computer, which runs a window-based operating system and carries out other sorts of computer applications, in addition to the secure decryption function of display adapter 46. Therefore, the display adapter is capable of displaying both the decrypted data and other, non-secure application data on the same screen simultaneously. (Decryption processor 50 may be bypassed Or operate in pass-through mode for displaying the non-secure data.) Alternatively, the method may be simplified, as will be apparent to those skilled in the art, if adapter 46 is limited to displaying decrypted data in full-screen mode.

To initiate decryption, CPU 40 opens a window on screen 28 in which the decrypted data are to be displayed, at a window definition step 60. Typically, the CPU opens the decryption window in response to a command by the user of terminal 20 when the user wishes to read an encrypted message or other encrypted data. Alternatively, the CPU may open the window automatically upon receipt of encrypted data from source computer 24.

The CPU then writes the encrypted data that are to be decrypted and displayed in the window to adapter memory 48, at a data input step 62. Together with the data, the CPU submits a header or other instructions to processor 50 indicating that the data should be decrypted (and possibly including decryption parameters, such as a key identifier), and defining the window in which the decrypted data should be displayed. Decryption processor 50 reads the instructions, decrypts the data, and writes the decrypted data to the appropriate address range in screen memory 54, at a decryption step 64. As noted above, the decrypted data may have the form of alphanumeric characters, a bitmap, or graphical vectors, depending on the type of data involved and the rendering capabilities of screen driver 56. The screen driver reads the decrypted data from memory 54, and displays the decrypted content in the appropriate window on screen 28, at a display step 66.

The method described above is suitable for displaying a single block of data (characters and/or graphics) of a predetermined size. After viewing one block, the user may prompt CPU 40 to return to step 62 and feed the next block of encrypted data to adapter 46. Alternatively, for interactive applications, CPU 40 may load a file of data into adapter memory 48, and decoder 50 may be configured to receive various user inputs so that the user can navigate through the file and change display parameters while viewing the file contents on screen 28. For example, the decryption processor may be programmed to support a Web browser-type interface in the window assigned for display of decrypted data. In this case, CPU 40 may pass encrypted graphical and text objects, together with markup-language instructions (which may or may not be encrypted) to adapter 46, which then displays the decrypted graphics and text in the browser interface. The decryption processor may similarly be programmed to support application interfaces of other types.

As noted above, terminal 20 may also be configured to receive user input, via keyboard 34, for example, in response to the decrypted data that are displayed on screen 28. The encryption function of processor 57 may be turned on when secure encryption of the user input is required. Alternatively, if the keyboard is not configured for secure encryption, the user input will reach CPU 40 in non-encrypted form, and may therefore be vulnerable to unauthorized access. Even so, application security is still enhanced, because the unauthorized party is unable to modify the contents of the display that has prompted the user input. For example, in an interactive banking application, a malicious party may attempt to spoof certain contents of the screen, in order to cause the user to approve a transfer of funds to a different account and/or in a different amount from the account and/or amount that are actually displayed on the screen. If the application uses secure decryption, as described above, the malicious party will be barred from access to the screen contents, and this sort of spoofing is prevented.

Although the description above relates to uses of embodiments of the present invention in preventing unauthorized access to decrypted data, the architecture and methods associated with these embodiments may also be useful in enhancing the efficiency and reliability of various encryption and decryption processes, as will be apparent to those skilled in the art. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Decryption apparatus, comprising:
   an input memory, which is coupled to receive encrypted data that have been transmitted to the apparatus over a network and written to the input memory;
   an output transducer, for presenting decrypted data to a user;
   a decryption processor, which is coupled to read and decrypt the encrypted data from the input memory but is incapable of writing to the input memory, due to lack of a hardware connection between a write output of the decryption processor and the input memory, and which decryption processor is coupled to convey the decrypted data to the output transducer for presentation to the user; and
   an output memory, which is coupled to receive the decrypted data from the decryption processor and to output the decrypted data to the output transducer,
   wherein the input memory is coupled to receive the encrypted data from a central processing unit (CPU) of a computer, and wherein the output memory is inaccessible to the CPU, due to lack of a hardware connection between the output memory and the CPU.

2. The apparatus according to claim 1, wherein the decryption processor has an output that is coupled to the output transducer, and
   wherein the apparatus comprises a central processing unit (CPU) and a communication interface, wherein the CPU is coupled to receive the encrypted data from the communication interface and to write the encrypted data to the input memory, and wherein the CPU is unable to access the output of the decryption processor.

3. The apparatus according to claim 2, wherein the output transducer comprises a video display, and wherein the CPU is arranged to define a window on the video display for presentation of the decrypted data, and wherein the decryption processor is arranged to write the decrypted data to the window.

4. The apparatus according to claim 2, wherein the decryption processor is arranged to decrypt the encrypted data using a predetermined key, and wherein the CPU is unable to access the predetermined key.

5. The apparatus according to claim 1, wherein the output transducer comprises a video display.

6. The apparatus according to claim 1, wherein the output transducer comprises an audio speaker.

7. The apparatus according to claim 1, wherein the output transducer comprises a printer.

8. A method for decryption, comprising:
   receiving encrypted data that have been transmitted over a network from a central processing unit (CPU) of a computer and writing the received encrypted data to an input memory;
   reading and decrypting the encrypted data from the input memory using a decryption processor, which is incapable of writing to the input memory, due to lack of a hardware connection between a write output of the decryption processor and the input memory; and
   conveying the decrypted data from the decryption processor to an output transducer for presentation to a user, through an output memory, which is coupled to receive the decrypted data from the decryption processor and to output the decrypted data to the output transducer,
   wherein the output memory is inaccessible to the CPU, due to lack of a hardware connection between the output memory and the CPU.

9. The method according to claim 8, wherein conveying the decrypted data comprises writing the decrypted data to an output memory, which is coupled to output the decrypted data to the output transducer.

10. The method according to claim 9, wherein receiving the encrypted data comprises writing the encrypted data from a central processing unit (CPU) of a computer to the input memory, wherein the output memory is inaccessible to the CPU.

11. The method according to claim 8, wherein the decryption processor has an output that is coupled to the output transducer, and wherein receiving the encrypted data comprises receiving the encrypted data via a communication interface using a central processing unit (CPU) and writing the encrypted data to the input memory using the CPU, wherein the CPU is unable to access the output of the decryption processor.

12. The method according to claim 11, wherein the output transducer comprises a video display, and wherein the method comprises defining, using the CPU, a window on the video display for presentation of the decrypted data, and wherein conveying the decrypted data comprises writing the decrypted data from the decryption processor to the window.

13. The method according to claim 11, wherein the decryption processor is arranged to decrypt the encrypted data using a predetermined key, and wherein the CPU is unable to access the predetermined key.

14. The apparatus according to claim 8, wherein the output transducer comprises a video display.

15. The apparatus according to claim 8, wherein the output transducer comprises an audio speaker.

16. The apparatus according to claim 8, wherein the output transducer comprises a printer.

17. The apparatus according to claim 1, wherein the write output of the decryption processor is coupled to the output transducer, but not to the input memory.

18. The method according to claim 8, wherein the write output of the decryption processor is coupled to the output transducer, but not to the input memory.

19. The apparatus according to claim 2, wherein the CPU is unable to access the output of the decryption processor, due to lack of a hardware connection between the CPU and the output of the decryption processor.

* * * * *